United States Patent Office 3,686,159
Patented Aug. 22, 1972

3,686,159
ETHYLENE POLYMERIZATION
Ronald Bauer, Orinda, Harold Chung, Berkeley, Kenneth W. Barnett, San Leandro, Peter W. Glockner, Alameda, and Wilhelm Keim, Berkeley, Calif., assignors to Shell Oil Company, New York, N.Y.
No Drawing. Continuation-in-part of application Ser. No. 886,788, Dec. 19, 1969. This application Sept. 8, 1970, Ser. No. 70,583
Int. Cl. C08f 1/74, 3/06
U.S. Cl. 260—94.9 C
15 Claims

ABSTRACT OF THE DISCLOSURE

Ethylene is polymerized to products of high linearity in the presence of a nickel complex of stable phosphorus ylids containing a conjugated carbonyl-containing functional group or a conjugated cyclic ring as a second chelating site.

This application is a continuation-in-part of Ser. No. 886,788, filed Dec. 19, 1969, now abandoned.

BACKGROUND OF THE INVENTION

U.S. Pat. 2,998,416, of Mendel, issued Aug. 29, 1961, teaches the polymerization of olefins in the presence of a catalyst which is the product of the reaction between a titanium compound selected from the group consisting of the halides, subhalides, oxyhalides, complex halides, cyclopentadienyl chelates, chelates of beta ketones, oxides, salts of organic acids and esters with a phosphorus ylid compound, i.e., a pentavalent phosphorus compound wherein the phosphorus atom is double bonded to carbon. The ylids of the Mendel patent are described as having the following generic structure:

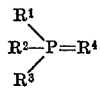

wherein $R^1$, $R^2$, and $R^3$ are the same or different and are organic radicals such as hydrocarbon and substituted hydrocarbon radicals preferably selected from the group of radicals consisting of normal or branched chain alkyl, halogenated alkyl, hydroxyalkyl, alkoxyalkyl, aroxyalkyl, aralkyl, aryl, alkaryl, halogenated aryl, hydroxyaryl, aroxyaryl, alkoxyaryl, and cycloalkyl radicals substituted with halogen, hydroxy, alkoxy, aryloxy, aryl or alkyl groups; and $R^4$ is selected from hydrocarbon and substituted hydrocarbon radicals. Although these ylids are relatively unstable monodentate complexing ligands, they apparently form active polymerization catalysts in combination with titanium compounds, which titanium compounds are well known for their utility in Ziegler-type polymerization. Generally, however, such relatively unstable ylids also form active polymerization catalysts with Group VIII metals, particularly with divalent nickel compounds.

SUMMARY OF THE INVENTION

It has now been found that an improved process of polymerizing ethylene is obtained through the use of nickel complexes of stable phosphorus ylids selected from (1) phosphorus ylids containing at least one carbonyl-containing functional group which is conjugated with the carbon-phosphorus double bond of the ylid and (2) phosphorus ylids wherein the carbon atom double bonded to phosphorus is a member of a diolefinically unsaturated aliphatic ring or an aromatic ring in which the ring unsaturation is conjugated with the carbon-phosphorus double bond of the ylid. The process is characterized by an ethylene conversion at moderate temperature to a product mixture containing oligomeric products, e.g., dimer, trimer, tetramer and higher oligomers, which are highly linear in character and predominantly alpha-olefins, as well as thermoplastic linear polyethylene.

DESCRIPTION OF PREFERRED EMBODIMENTS

The catalyst: The nickel catalyst of the invention comprises an atom of nickel complexed with phosphorus ylids selected from (1) phosphorus ylids wherein the carbon-phosphorus double bond of the ylid is conjugated with a carbonyl-containing functional group selected from formyl; hydrocarboyl such as alkanoyl, aroyl and alkaroyl; hydrocarbyloxycarbonyl such as alkoxycarbonyl and aroxycarbonyl; carbamyl; N-hydrocarbylcarbamyl and N, N-dihydrocarbylcarbamyl and (2) phosphorus ylids wherein the carbon atom double bonded to phosphorus is a member of a diolefinically unsaturated aliphatic or an aromatic ring in which the ring unsaturation is conjugated with the carbon-phosphorus double bond of the ylid. Although it is not known with certainty, it is considered likely that the conjugated groups, e.g.,

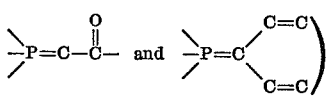

of the phosphorus ylid are complexed with the nickel moiety as a bidentate ligand.

The phosphorus ylids of the invention generally have from 6 to 100 carbon atoms but preferably from 6 to 60 carbon atoms. A suitable class of phosphorus ylids are represented by the Formula I:

(I)

wherein $R^1$, $R^2$ and $R^3$ are the same or different and are organic radicals of up to 24 carbon atoms, preferably of up to 12 carbon atoms, such as hydrocarbon and substituted hydrocarbon radicals preferably selected from the group of radicals consisting of normal or branched chain alkyl, halogenated alkyl, hydroxyalkyl, alkoxyalkyl, aroxyalkyl, aralkyl, aryl, alkaryl, halogenated aryl, hydroxyaryl, aroxyaryl, alkoxyaryl, and cycloalkyl radicals substituted with halogen, hydroxy, alkoxy, aryloxy, aryl or alkyl groups; and $R^5$ and $R^6$ are independently selected from the same groups as those for $R^1$, $R^2$ and $R^3$ and additionally can be hydrogen or

wherein X is alkyl, aryl, aralkyl, alkoxy, aryloxy, amino, N-alkylamino, N-arylamino, N,N-dialkylamino or N,N-diarylamino of up to 12 carbon atoms, with the proviso that the methylene carbon, $R^5$ and $R^6$, together can form a hydrocarbon or heterocyclic ring of up to 10 carbon atoms, preferably of from 4 to 6 carbon atoms and with the further proviso that when both $R^5$ and $R^6$ are $R^1$, $R^2$ or $R^3$, the methylene carbon, $R^5$ and $R^6$ together can form a diolefinically unsaturated aliphatic ring of 5 carbon atoms or an aromatic ring.

Exemplary ylids of Formula I wherein both $R^5$ and $R^6$ are $R^1$, $R^2$ and $R^3$ (i.e., the methylene carbon atom of the ylid is a member of a diolefinically unsaturated ring or an aromatic ring) are triphenylphosphonium cyclopentadienylide (Formula II) and 9-fluorenylidenetriphenylphosphorane (Formula III).

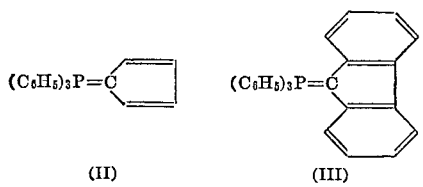

Exemplary ylids of Formula I wherein at least one of $R^5$ or $R^6$ is a carbonyl-containing functional group

are carbethoxymethylene-(tri - p - chlorophenyl)phosphorane, carbomethoxyethylidene(tri-p-acetoxyphenyl)-phosphorane, 2-(triphenylphosphoraneylidene)-2-butyrolactone, acetylmethylenediphenylethylphosphorane, and acetylethylidenetritolylphosphorane.

Other suitable ylids of Formula I are those found in Ylid Chemistry, W. William Johnson, Academic Press, New York (1966), particularly on pages 24 to 29.

Phosphorus ylids of Formula I wherein the $R^1$, $R^2$ and $R^3$ substituents of the phosphorus atom are wholly aromatic (i.e., bonded to the phosphorus atom through a carbon atom which is part of an aromatic ring) are preferred over those in which the substituents are a mixture of aromatic and aliphatic or wholly aliphatic. Particularly preferred phosphorus ylids are those wherein $R^5$ or $R^6$ are carbonyl-containing functional groups, especially alkanoyl and alkoxycarbonyl of up to 6 carbon atoms.

Although it is not desired to be bound by any particular theory it appears likely that the catalyst molecule undergoes chemical transformations during the course of the polymerization reaction possibly involving coordination and/or bonding of ethylene to the nickel moiety. However, it appears likely that the ylid ligand remains complexed and/or chemically bonded to the nickel moiety during the course of the reaction and that this complex of nickel and ylid ligand is the effective catalytic species of the polymerization process. In any event, the ylid ligand is an essential component of the catalyst and, provided the nickel catalyst contains the required ylid ligand, the nickel catalyst may be complexed with a variety of additional organic complexing ligands.

In terms of the ylid ligands of Formula I, the nickel catalyst of the present invention may be represented by the general Formula IV:

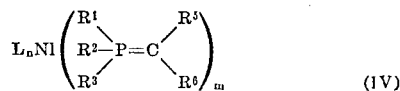

wherein $R^1$, $R^2$, $R^3$, $R^5$ and $R^6$ have the same significance as defined for Formula I, L is a non-ionic, neutral organic complexing ligand, $m$ and $n$ are selected from whole numbers of from 1 to 3 and the sum of $n$ and $m$ is preferably 4. However as pointed out hereinafter, it is preferred to describe the catalyst as the reaction product of the nickel compound with the ylid ligand and it is to be understood that Formula IV is meant only to represent empirical compositions and that the precise nature of the bonding between the phosphorus ligand and the nickel moiety is not definitely known. However, it is considered likely that the nickel is in a low valence state, i.e., zero-valent or mono-valent, which valence state is dependent on the nature of the chemical bonding between the nickel moiety and the ylid ligand, and that the coordination number of the nickel atom typically is four. The organic complexing ligand L is any ligand other than the required ylid ligand which is complexed to the nickel atom. In general, non-ionic, neutral complexing ligands such as organophosphines, organoarsines, organostibines, organobismuthines and like ligands which are complexed to the nickel moiety are satisfactory. However, preferred complexing ligands are olefinically unsaturated compounds of from 2 to 20 carbon atoms, of up to 4 olefinic linkages and of up to 3 carbocyclic rings. Suitable olefinically unsaturated compounds are substituted-olefins having functional groups containing the atoms of halogen, oxygen, nitrogen and/or sulfur such as acrylonitrile, vinyl chloride, ethyl vinyl ketone, vinyl acetate and methyl methacrylate. A particularly preferred class of olefinically unsaturated compounds for L are hydrocarbon olefins of from 2 to 12 carbon atoms and represented by the Formula V:

wherein R' and R'' independently are hydrogen, alkyl, cycloalkyl, alkenyl, cycloalkenyl, aralkyl, aryl or alkaryl of up to 8 carbon atoms, with the proviso that the R' and R'' groups may together form a divalent aliphatic moiety of from 2 to 10 carbon atoms of up to three additional olefinic double bonds.

Illustrative olefins of Formula V therefore include ethylene, propylene, 2-butene, 1-pentene, 1-hexene, 1-octene, 1-decene, butadiene, isoprene, 1,3,5-octatriene, 1,3,7-octatriene, cyclopentene, cycloheptene, norbornene, pinene, camphene, cyclopentadiene, cyclohexa-1,3-diene, cyclo-octa-1,5-diene, cyclooctatriene, cyclooctatetraene and cyclododecatriene.

The catalysts of the present invention are typically formed in situ in the reaction medium but the present invention encompasses the nickel-ylid catalysts as described regardless of what sequence is used for catalyst preparation and polymerization. Whether the catalyst is formed prior to its use as a polymerization catalyst or is formed in the reaction medium while the polymerization is proceeding, its exact active form during the polymerization reaction is not precisely ascertainable. For this reason the catalyst is preferably described as the product of the reaction of certain nickel compounds with the phosphorus ylid ligand.

The nickel catalyst is prepared by a variety of methods. In a preferred method, the catalyst composition is prepared by contacting a zero-valent olefinic nickel compound with the ylid ligand. The term "zero-valent olefinic nickel" compound is meant to apply to nickel compounds wherein the formal oxidation state of the nickel is zero, i.e., nickel compounds wherein the olefinic ligands are π-bonded to the nickel as opposed to the sigma bonding between nickel and, for instance, cyclopentadienyl ligands. The preferred class of olefinic nickel compounds useful as catalyst precursors are zero-valent nickel compounds represented by the Formula VI:

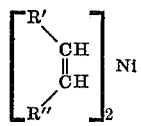

(VI)

wherein R'CH=CHR" has the same significance as defined for Formula V. Illustrative nickel compounds of Formula VI are therefore biscyclooctadienenickel(O), biscyclooctatetraenenickel(O), and bis(1,3,7-octatriene) nickel(O). Other suitable zero-valent olefin nickel compounds are those disclosed in British Patent 935,716, published Sept. 4, 1963.

Other classes of olefinic nickel compounds useful as catalyst precursors are π-allyl nickel compounds wherein the nickel moiety is bonded to a π-allylic moiety characterized by delocalization of the electronic contribution of the π-allyl moiety among three contiguous carbon atoms. One suitable type of π-allyl nickel compounds is represented by the Formula VII:

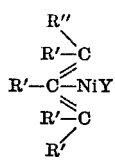

(VII)

wherein R' and R" have the same significance as for Formula V, Y is halogen, preferably halogen of atomic number from 17 to 35 inclusive, i.e., chlorine or bromine, alkoxy or alkanoyloxy of up to 10 carbon atoms, and the dotted line designation represents the electronic delocalization among the three illustrated contiguous carbon atoms, with the proviso that R" together with one R' may form a divalent alkylene moiety of 2 to 10 carbon atoms, preferably 2 to 5, and of up to 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formula VII are π-allylnickel chloride, π-allylnickel bromide, π-crotylnickel chloride, π-methylallylnickel chloride, π-ethylallylnickel chloride, π-cyclopentenylnickel chloride, π-cyclooctenylnickel bromide, π-cyclooctadienylnickel chloride, π-cinnamylnickel bromide, π-phenylallylnickel chloride, π-cyclohexenylnickel bromide, π-cyclodidecenylnickel chloride and π-cyclododecatrienylnickel chloride. Although the complex of the above Formula VII and other π-allyl nickel halides probably exist independently in the form of a dimer, for convenience and simplicity the π-allyl nickel halides are herein depicted and named as monomeric species. Other suitable π-allyl nickel compounds of Formula VII are π-allylnickel acetate, π-methylallylnickel propionate and π-cyclooctenylnickel octoate.

Other suitable types of π-allyl nickel compounds useful as catalyst precursors are bis-π-allyl nickel compounds represented by the Formula VIII:

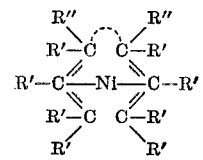

(VIII)

wherein R", R' and the dotted line designation have the same significance as defined in Formula VII with the proviso that R" together with one R' of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis-π-allyl nickel compounds of the above Formula VIII are bis-π-allyl nickel, bis-π-methallyl nickel, bis-π-cinnamylnickel, bis-π-octadienyl nickel, bis-π-cyclohexenyl nickel, π-allyl-π-methallyl nickel, and bis-π-cyclooctatrienyl nickel.

The π-allyl compounds of Formula VII and VIII are known in the art. See, for example, U.S. 3,422,128, U.S. 3,424,777 and U.S. 3,432,530.

The nickel catalyst compound and the ylid ligand are generally contacted in substantially equimolar amounts. The molar ratio of olefinic-nickel compound to ylid ligand can vary from about 0.5:1 to 1:12, but is preferably about 1:1 to 1:4. The catalyst composition is suitably preformed by contacting the catalyst precursors in an inert diluent, e.g., diluents employed for the polymerization process. In another modification, however, the catalyst precursor components are contacted in the presence of the ethylene reactant during the initiation of the polymerization process. By any modification, the catalyst precursor components are contacted at temperatures from about 25° C. to 100° C.

The nickel catalyst is suitably employed as an unsupported material. In certain modifications, however, it has been found desirable to employ the nickel catalyst supported on an inorganic, solid catalyst carrier which is normally solid under reaction conditions and is heterogeneous, i.e., is substantially insoluble in the reaction medium. Illustrative of suitable inorganic, solid catalyst carriers are inorganic acidic oxides such as alumina and inorganic materials known as refractory oxides. Suitable refractory oxides include synthetic components as well as acid treated clays and similar materials such as kieselguhr or crystalline macroreticular aluminosilicates known in the art as molecular sieves. In general, synthetic catalyst carriers are preferred over natural occurring materials or molecular sieves. Exemplary synthetic catalyst carriers include alumina, silica-alumina, silica-magnesia, silica-alumina-titania, silica-alumina-zirconia, silica-titania-zirconia, silica-magnesia-alumina and the like. Particularly preferred catalyst carriers are siliceous refractory oxides containing up to 90% by weight of alumina, especially silica and silica-alumina.

In one particular embodiment of the present invention, the catalyst is supported on ethylene polymer. In this embodiment, the catalyst is formed in the presence of ethylene which is simultaneously polymerized at low pressure, e.g., 10–100 p.s.i.g., to form the catalyst support. The supported catalyst is then removed from the reaction mixture and later used as a heterogeneous catalyst for other polymerization reactions preferably the polymerization of ethylene.

When the catalyst composition is supported, the proportion of catalyst composition to carrier is not critical. In general, proportions of catalyst composition from about 0.01% to about 70% by weight, based on the catalyst carrier are satisfactory, with amounts of from about 0.1% to about 20% by weight, calculated on the same basis, being preferred. The catalyst composition is introduced into the carrier in any suitable manner. In one modification, the supported catalyst composition is prepared by intimately contacting the pre-formed catalyst composition and the carrier in an inert diluent, preferably the same inert diluent employed for preparing the catalyst composition. In another modification, the catalyst compositions can be prepared directly on the catalyst carrier support surface by contacting the catalyst composition precursors in the presence of the catalyst carrier in a suitable inert diluent.

The amount of catalyst composition employed in the polymerization process is not critical. In general, amounts of catalyst composition from about 0.001% by weight to about 100% by weight based on ethylene are satisfactory with amounts from about 0.01% by weight to about 25% by weight on the same basis being preferred.

Reaction conditions: The ethylene is contacted with the catalyst composition or the catalyst precursor components in the absence or presence of reaction solvent or diluent which is liquid at reaction temperature and pressure and is inert to the reactants and products. Suitable solvents or diluents are non-polar organic solvents such as aliphatic hydrocarbons, e.g., alkanes and alkenes, including cycloalkanes and cycloalkenes, of from 5 to 20 carbon atoms, such as butene-1, isopentene, cyclopentane, cyclohexane, cyclohexene, isohexane, heptane, isooctane, decane, decene-1, dodecene, hexadecene and eicosane; haloalkanes, e.g., ethylene dichloride, hexachloroethane, 1,4-dichlorobutane; and halocyloalkanes, e.g., chlorocyclohexane. When olefins are employed as solvents, they do not undergo homo-polymerization or co-polymerization with ethylene to any significant extent. Other suitable solvents or diluents are polar organic compounds such as aromatic compounds and organic compounds containing atoms such as oxygen, sulfur, nitrogen and phosphorus incorporated in functional groups such as hydroxy, alkoxy, aryloxy, carboalkoxy, alkanoyloxy, cyano, amino, alkylamino, dialkylamino, amide, N-alkylamide, N,N-dialkylamide, sulfonylalkyl and like functional groups. Illustrative aromatic compounds are monocarbocyclic aromatic compounds such as benzene, toluene and xylene and halo-aromatics such as chlorobenzene, dichlorobenzene and hexafluorobenzene. Illustrative oxygenated organic solvents are fully esterified polyacyl esters of polyhydroxy alkanes such as glycerol triacetate, tetraacyl esters of erythritol, diethylene glycol diacetate; monoesters such as ethyl acetate, butyl propionate and phenyl acetate; ketones such as acetone, methyl ethyl ketone and methyl isobutyl ketone; cycloalkyl ethers, e.g., dioxane, tetrahydrofuran, and tetrahydropyran; acyclic alkyl ethers, e.g., dimethoxyethane, diethylene glycol dimethyl ether and dibutyl ether; aromatic ethers such as anisole, 1,4-dimethoxybenzene and p-methoxytoluene; aliphatic alcohols such as methanol, trifluoroethanol, hexafluoroethanol, trifluoropropanol, sec-butanol, perfluorobutanol, octanol, dodecanol, cycloalkanols, e.g., cyclopentanol, and cyclohexanol; polyhydric acyclic hydroxyalkanes such as ethylene glycol, propylene glycol, 1,4-butanediol, glycerol and trimethylene glycol; phenols, such as cresol, p-chlorophenol, m-bromophenol, 2,6-dimethylphenol, p-methoxyphenol, 2,4-dichlorophenol; and alkylene carbonates such as ethylene carbonate, propylene carbonate and butylene carbonate. Illustrative nitrogen-containing organic solvents are nitriles, e.g., acetonitrile and propionitrile; amines, e.g., butylamine, dibutylamine, trihexylamine. N - methylpyrrolidine, N-methylpiperidine, and aniline; N,N - dialkylamides, e.g., N,N - dimethylformamide and N,N - dimethylacetamide. Illustrative sulfur-containing solvents are sulfolane and dimethylsulfoxide and illustrative phosphorus-containing solvents are trialkylphosphate, e.g., trimethyl phosphate, triethylphosphate and tributylphosphate.

In some modifications of the polymerization process, no added solvent or diluent is employed. When diluent is utilized, however, amounts up to about 30 moles of diluent per mole of ethylene are satisfactory. Preferred reaction diluents and solvents are polar organic solvents, especially aromatic compounds and oxygenated organic solvents.

A particularly surprising aspect of the present invention is that the polymerization reaction can be suitably carried out in water and water is the most preferred reaction medium for this invention. The water may but does not necessarily additionally contain a polar organic solvent. Suitable mixtures of water and polar organic solvent vary from about 20% to 80% by volume organic solvent and from about 80% to 20% of water.

The process is suitably conducted in an inert reaction environment so that the presence of reactive materials such as oxygen is desirably avoided. Reaction conditions are therefore substantially oxygen-free.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene reactant in liquid phase solution in the reaction diluent through a reaction zone in which a supported catalyst composition is maintained. By any modification, the polymerization process is conducted at moderate temperatures and pressures. Suitable reaction temperatures vary from about 25° C. to 250° C. but preferably from 30° C. to 80° C. The reaction is conducted at or above atmospheric pressure. The precise pressure is not critical, so long as the reaction mixture is maintained substantially in a non-gaseous phase. Typical pressures vary from about 10 p.s.i.g. to 5000 p.s.i.g. with the range from about 100 p.s.i.g. to 1000 p.s.i.g. being preferred.

The polymerization products are separated and recovered from the reaction mixture by conventional methods such as fractional distillation, selective extraction, filtration, adsorption and the like. The reaction diluent, catalyst and any unreacted ethylene are recycled for further utilization.

During the polymerization process ethylene is converted to dimer, trimer, tetramer and like oligomers as well as polymer, i.e., polyethylene. The oligomer products are characterized by a high proportion of linear, terminal olefins. The polyethylene products are characterized by high linearity, crystallinity and molecular weight. Generally, the polyethylene products are further characterized by a linearity of less than 1 branch per 1000 monomer units and an inherent viscosity (0.10 g./100 ml. decane at 135° C.) of between 0.1 to 10 dl./g.

To further illustrate the improved process of the invention and the novel catalyst composition therefor, the following examples are provided.

EXAMPLE I

A 300 ml. stainless steel autoclave was charged with a solution of 0.200 g. biscyclooctadiene-1,5-nickel, 1.00 g. (carbethoxymethylene)triphenyl phosphorane [$\phi_3P=CH\ CO_2C_2H_5$], and 130 ml. dry hexane. The autoclave was purged with argon, pressured to 1000 p.s.i. with ethylene and heated to 60° C. The pressure inside the reactor was maintained at 1000 p.s.i. throughout the run. After 1 hour the reactor was cooled to room temperature, the unreacted ethylene was vented, and the resulting polymer was isolated by precipitation in methanol. There was obtained 48 g. of polyethylene having an inherent viscosity of 0.17 dl./g. (0.3 g. polymer/100 ml. Decalin at 135° C.

EXAMPLES II–X

Ethylene was polymerized via procedures similar to that detailed in Example I in the presence of various catalyst compositions of the present invention. The results of these polymerizations are reported in Table I.

TABLE I.—POLYMERIZATION OF ETHYLENE WITH BISCYCLOOCTADIENE-1,5-NICKEL AND AN YLID COMPOUND

[Solvent: 30 ml. toluene/120 ml. hexane; Temperature: 60° C.; Pressure: 900–1,000 p.s.i.; Time: 1 hr.]

| Example No. | Ylid structure ($\phi$ is phenyl) | Molar ratio, nickel: ylid | Polymer yield, g. | Inherent viscosity | Density |
|---|---|---|---|---|---|
| II | $\phi_3{-}P{=}C{-}\overset{O}{\overset{\|}{C}}{-}O{-}C_2H_5$ with $CH_3$ | 1:1 | 18.7 | 0.17 | |
| III | Same as above | 1:4 | 32.1 | 0.29 | |
| IV | $\phi_3{-}P{=}C{-}\overset{O}{\overset{\|}{C}}{-}OC_2H_5$ with $\phi$ | 1:4 | 12.2 | 0.24 | 0.969 |
| V | Same as above | 1:1 | 15.1 | 0.33 | |
| VI | $\phi_3{-}P{=}C{-}\overset{O}{\overset{\|}{C}}{-}CH_3$ with $H$ | 1:2 | 77.5 | 0.06 | |
| VII | $\phi_3{-}P{=}C{-}\overset{O}{\overset{\|}{C}}{-}CH_3$ with $CH_3$ | 1:2 | 5.3 | 0.14 | |
| VIII | $\phi_3{-}P{=}C{-}\overset{O}{\overset{\|}{C}}{-}\phi$ with $\phi$ | 1.4 | 9.6 | 4.1 | 0.962 |
| IX | $\phi_3{-}P{=}C\begin{smallmatrix}\overset{O}{\overset{\|}{C}}{-}CH_3\\ \overset{\|}{\underset{O}{C}}{-}CH_3\end{smallmatrix}$ | 1.2 | 1.40 | 0.34 | 0.963 |
| X | $\phi_3{-}P{=}$ (cyclic with $\overset{O}{\overset{\|}{C}}{-}O$) | 1.4 | 0.8 | 0.10 | |

EXAMPLE XI

Biscyclooctadiene-1,5-nickel (0.14 g., 0.5 mm.) and triphenylphosphonium cyclopentadienylide (0.16 g., 0.5 mm.) were dissolved in 40 cc. of dry toluene and the resultant solution was charged to a stirred, stainless steel 85 cc. autoclave. The vessel was pressured with ethylene (5.8 g.) and heated to 70° C. After 45 minutes a pressure drop from 465 p.s.i.g. to 300 p.s.i.g. had been achieved. The vessel was cooled to room temperature, vented and opened. The yield of polyethylene was 4.1 g. and the product had an intrinsic viscosity (Decalin, 130° C.) of 4.6 dl./gm. and a density of 0.954.

EXAMPLE XII

A polymerization conducted as in Example XI except with a nickel:ylid molar ratio of 1:2 produced in one hour 2.5 grams of polyethylene having similar viscosity and density properties.

EXAMPLE XIII

Biscyclooctadiene-1,5-nickel(O) (275 mg.) and 430 mg. of 9-fluorenylidenetriphenylphosphorane were admixed in 30 ml. of toluene and stirred overnight at ambient temperature. The resulting catalyst solution in amount of 10 ml. was charged into a metal pressure reactor along with 15 ml. of n-hexane. Ethylene monomer was then added to an initial pressure of 850 p.s.i., and the polymerization reaction was carried out at 60–65° C. for 1 hour. The polymer formed was precipitated with methanol, filtered and dried in vacuo. The yield was 1.2 g. of linear polyethylene.

EXAMPLE XIV

The following example illustrates the preparation and use of a supported catalyst of the present invention.

A solution of 450 mg. biscyclooctadiene-1,5-nickel(O), 1184 mg. α,α-diacetylmethylenetriphenylphosphorane, 60 ml. toluene and 240 ml. of n-hexane was charged into a glass pressure vessel and stirred under a constant ethylene pressure of 15 p.s.i. at 60° C. for 1 hour. The product mixture was then recovered via high vacuum distillation at ambient temperature. This process yielded 2.3 g. of linear polyethylene-supported nickel-containing catalyst. 130 mg. of this polyethylene-supported nickel-containing catalyst and 150 ml. of n-hexane were charged into a steel pressure reactor. Ethylene monomer was then polymerized at 900–1,000 p.s.i. at 60° C. for 1 hour. The polymer formed was precipitated with methanol, filtered and dried in vacuo. The yield was 9.3 g. of linear polyethylene.

EXAMPLE XV

A catalyst solution prepared from 0.0743 g. nickelocene and 0.545 g. (carbethoxyethylidene)triphenylphosphorane in 30 ml. dry toluene was charged to a 100 ml. stainless steel atuoclave under a nitrogen atmosphere. The reactor was initially pressured with 1000 p.s.i. ethylene (18.5 grams) and reacted at 60° C. After a one hour reaction period, the unreacted ethylene was vented. Analysis of the reaction mixture showed less than 0.1 gram linear polyethylene and a slight trace of ethylene oligomers.

A comparison between this example and Example II shows the substantial superiority of the zero-valent nickel catalyst precursors of the present invention over divalent nickel compounds.

EXAMPLES XVI–XX

Ethylene was polymerized via procedures similar to that detailed in Example I in the presence of various catalyst compositions except at lower ethylene pressures. The results are tabulated in Table II.

EXAMPLE XXI

A mixture of 3.12 g. of carbethoxyethylidenetriphenylphosphorane [$\phi_3P=C(CH_3)COOC_2H_5$, where $\phi$ is phenyl] and 1.42 g. of bisacrylonitrilenickel(O) in 50 ml. tetrahydrofuran was refluxed for 6 hours and then filtered. The filtrate was charged to a 300 ml. autoclave for ethylene polymerization under the reaction conditions tabulated in Table III. The results are provided in Table III.

EXAMPLE XXII (A) A 300 ml. autoclave was charged with a solution of 1 millimole of biscyclooctadiene-1,5-nickel, 1 millimole of carbethoxyethylidenetriphenylhposphorane, and 100 ml. of trimethylphosphate. Ethylene was then charged to the autoclave. The reaction conditions and results are provided in Table IV as Run A.

(B) The polymerization reaction of Example XXII A was repeated, except that 0.15 millimole of triphenylphosphine was added as a catalyst complexing ligand. The results are provided in Table IV as Run B.

EXAMPLE XXIII

A mixture of 2.37 g. of α,α-diacetylmethylenetriphenylphosphorane and 0.9 g. of biscycloocetadiene-1,5-nickel was dissolved in 95 ml. of toluene and then diluted with 205 ml. of n-hexane. The resulting catalyst solution was then charged to an autoclave and reacted under a constant ethylene pressure of 15 p.s.i.g. at 58° C. for 3 hours. After all volatile materials were removed via high vacuum distillation, the residue consisted of 8.6 g. of polyethylene containing 2.33% by weight of nickel, calculated as the metal.

A 0.5 g. sample of the above produced polyethylene supported nickel catalyst, 0.1 g. of triphenylphosphine, 25 ml. of toluene and 25 ml. of n-hexane were charged into a 100 ml. autoclave. Ethylene was then charged and maintained at 500 p.s.i.g. and 60° C. for 68 minutes. Analysis of the product mixture showed a 24.5 g. yield of $C_4$–$C_{20}$ ethylene oligomers.

TABLE III

Bis(acrylonitrile)nickel and phosphine ylid

| | |
|---|---|
| $C_2H_4$ press., p.s.i.g. | 500 |
| Time, hr. | 2 |
| Temp., °C. | 65–70 |
| Activity, g./g. Ni hr. | 35 |
| Selectivity, percent w.: | |
| $C_4$ | 33.5 |
| $C_6$ | 22.0 |
| $C_8$ | 14.5 |
| $C_{10}$ | 10.1 |
| $C_{12}$ | 6.6 |
| $C_{14}$ | 4.3 |
| $C_{16}$ | 2.7 |
| $C_{18}$ | 1.8 |
| $C_{20}$ | 1.1 |
| $C_{22}+$ | 3.4 |
| Average linearity, $C_6$–$C_{20}$ (percent) | 97 |
| Average terminal double bond, $C_4$–$C_{20}$ (percent) | 94 |

TABLE IV

| Run No. | A | B |
|---|---|---|
| Triphenylphosphine, mmole | 0 | 0.15 |
| $C_2H_4$ press., p.s.i.g. | 250 | 250–300 |
| Temp., °C. | 55 | 50–60 |
| Activity, g./g. Ni x hr. | 910 | 250 |
| Selectivity, percent w.: | | |
| $C_4$ | 3.1 | 5.2 |
| $C_6$ | 5.0 | 7.7 |
| $C_8$ | 6.3 | 8.5 |
| $C_{10}$ | 6.7 | 9.0 |
| $C_{12}$ | 7.6 | 10.0 |
| $C_{14}$ | 8.1 | 11.0 |
| $C_{16}$ | 5.4 | 7.3 |
| $C_{18}$ | 5.1 | 6.1 |
| $C_{20}$ | 4.3 | 5.2 |
| $C_{22}+$ | 48.4 | 30.0 |
| Average linearity, $C_6$–$C_{20}$, percent | 96 | 96 |
| Average terminal double bond, $C_4$–$C_{20}$, percent | 94 | 93 |

EXAMPLE XXIV

A series of polymerization reactions with a nickel complex of carbethoxyethylidenetriphenylphosphorane and a variety of unsaturated olefinic compounds as additional complexing ligands was conducted. The complexing ligands employed were vinyl chloride, vinyl acetate, methyl acrylate or 1-butene. Each experiment was conducted by contacting 0.1 millimole of biscyclooctadiene-1,5-nickel, 0.2 millimole of carbethoxyethylidenetriphenylphosphorane, 20 g. of one of the indicated complexing ligands, 20 ml. of toluene, 60 ml. of hexane and 30 g.

TABLE II.—POLYMERIZATION OF ETHYLENE WITH BISCYCLOOCTADIENE-1,5-NICKEL AND AN YLID COMPOUND
[Solvent: 30 ml. benzene biscyclooctadiene-1,5-nickel: 1 millimole molar ratio nickel: ylid: 1:1]

| Example No. | XVII | XVIII | XIX | XX | XXI |
|---|---|---|---|---|---|
| Ylid ($\phi$=phenyl) | $\phi_3PCHCOOC_2H_5$ | $\phi_3PCHCOOC_2H_5$ | $\phi_3PCCH_3COOC_2H_5$ | $\phi_3PCH\overset{O}{\overset{\|}{C}}CH$ | $\phi_3PCH\overset{O}{\overset{\|}{C}}N\phi_2$ |
| $C_2H_4$ press., p.s.i.g. | 200 | 60–80 | Atm. | 100–200 | 100–200 |
| Temp., °C. | 35–40 | 35–40 | 30–50 | 55 | 60 |
| Activity, g./g. Ni hr. | 250 | 76 | 15 | 90 | 55 |
| Selectivity, percent w.: | | | | | |
| $C_4$ | 3.3 | 3.9 | 3.1 | 3.0 | 5.1 |
| $C_6$ | 5.3 | 7.6 | 4.9 | 4.9 | 6.1 |
| $C_8$ | 6.2 | 8.8 | 5.9 | 5.7 | 9.2 |
| $C_{10}$ | 6.9 | 9.1 | 6.5 | 6.1 | 7.1 |
| $C_{12}$ | 7.6 | 8.4 | 7.2 | 7.2 | 6.8 |
| $C_{14}$ | 7.9 | 7.3 | 7.4 | 8.4 | 6.5 |
| $C_{16}$ | 5.9 | 6.4 | 5.6 | 7.0 | 5.7 |
| $C_{18}$ | 4.9 | 4.8 | 4.7 | 4.6 | 4.3 |
| $C_{20}$ | 3.9 | 4.1 | 3.7 | 3.1 | 3.6 |
| $C_{22}+$ (including polymer) | 48.0 | 39.5 | 51.0 | 50.0 | 47.6 |
| Average linearity of $C_4$–$C_{20}$, percent | >91 | >92 | >94 | >95 | >95 | of ethylene in a stirred autoclave at 900 p.s.i.g. and 90° C. for 4 hours. In each experiment, ethylene was polymerized to a product mixture consisting of oligomers and/or polymers.

EXAMPLE XXV

When a nickel catalyst prepared from π-allylnickel bromide and carbethoxyethylidenetriphenylphosphorane is contacted with ethylene at elevated pressure and temperature by a procedure essentially identical to Example XXIV, a good yield of ethylene polymerization products is obtained.

We claim as our invention:

1. A process for polymerizing ethylene, at a temperature of 25° C. to 250° C., by contacting ethylene with catalytic amount of a nickel complex prepared by contacting in an inert diluent a zero-valent hydrocarbon olefin-nickel compound or a π-allyl nickel compound and a phosphorus ylid ligand of the formula

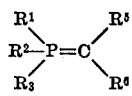

wherein $R^1$, $R^2$ and $R^3$ are the same or different and are organic radicals of up to 24 carbon atoms and selected from the group consisting of normal alkyl, branched alkyl, halogenated alkyl, hydroxyalkyl, alkoxyalkyl, aroxyalkyl, aralkyl, aryl alkaryl, halogenated aryl, hydroxyaryl, aroxyaryl, alkoxyaryl and cycloalkyl radicals substituted with halogen, hydroxy, alkoxy, aryloxy, aryl or alkyl groups; and $R^5$ and $R^6$ are members selected from the group consisting of (1) the same groups as $R^1$, $R^2$ and $R^3$ and hydrogen with the proviso that in addition at least 1 of $R^5$ and $R^6$ is a carbonyl containing functional group which is conjugated with the carbon phosphorus double bond of the ylid in said complex and (2) moieties which, together with the methylene carbon atom double bonded to the phosphorus in said ylid ligand, form diolefinically unsaturated hydrocarbon and heterocyclic rings of up to 10 carbon and aromatic rings, in which the ring unsaturation is conjugated with the carbon phosphorus double bond of the ylid.

2. The process of claim 1 wherein carbonyl containing functional group is

wherein X is selected from the group consisting of alkyl; aryl; aralkyl; alkoxy; amino; N-alkylamino; N-arylamino; N,N-dialkylamino and N,N-diarylamino all of up to 12 carbon atoms.

3. The process of claim 2 wherein the

substituent is alkanoyl or alkoxycarbonyl.

4. The process of claim 1 in which said nickel compound is reacted with said ylid ligand in a molar ratio of nickel compound to ylid of from about 0.5:1 to 1:12.

5. The process of claim 1 in which said nickel compound is reacted with said ylid ligand in a molar ratio of nickel compound to ylid of from about 1:1 to 1:4.

6. The process of claim 1 in which said nickel complex is supported on an inorganic, solid carrier.

7. The process of claim 6 in which said carrier is selected from the group consisting of inorganic acidic oxides and siliceous refractory oxides.

8. The process of claim 1 in which said nickel complex is supported on preformed ethylene polymer.

9. The process of claim 1 in which said nickel complex is employed in an amount of from about 0.001% by weight to 100% by weight based on the ethylene.

10. The process of claim 1 in which said polymerization process is carried out in liquid phase at a temperature of about 30° C. to 80° C.

11. The process of claim 1 wherein said polymerization process is carried out in liquid phase at a pressure from about 10 p.s.i.g. to 5000 p.s.i.g.

12. The process of claim 1 in which said nickel compound is reacted with said ylid at a temperature of from about 25° C. to 100° C.

13. The process of claim 12 wherein the zero-valent olefin-nickel compound is biscyclooctadienenickel(O) and $R^1$, $R^2$ and $R^3$ are wholly aromatic groups.

14. The process of claim 13 wherein the phosphorus ylid ligand is triphenylphosphonium cyclopentadienylide.

15. The process of claim 13 wherein the phosphorus ylid ligand is 9-fluorenylidenetriphenylphosphorane.

References Cited

UNITED STATES PATENTS

| | | | |
|---|---|---|---|
| 2,998,416 | 8/1961 | Mendel | 260—94.9 |
| 3,379,706 | 4/1968 | Wilke | 260—94.9 |
| 3,459,826 | 8/1969 | Barnett et al. | 260—683.15 |
| 3,454,538 | 7/1969 | Naarmann et al. | 260—94.9 |

JOSEPH L. SCHOFER, Primary Examiner

E. J. SMITH, Assistant Examiner

U.S. Cl. X.R.

252—431 P; 260—94.9 A, 94.9 B, 94.9 DA, 343.6, 439, 683.15 D